Sept. 21, 1943.  C. W. CLARK  2,329,827
ADAPTER FOR TESTING MACHINES
Filed Jan. 2, 1943
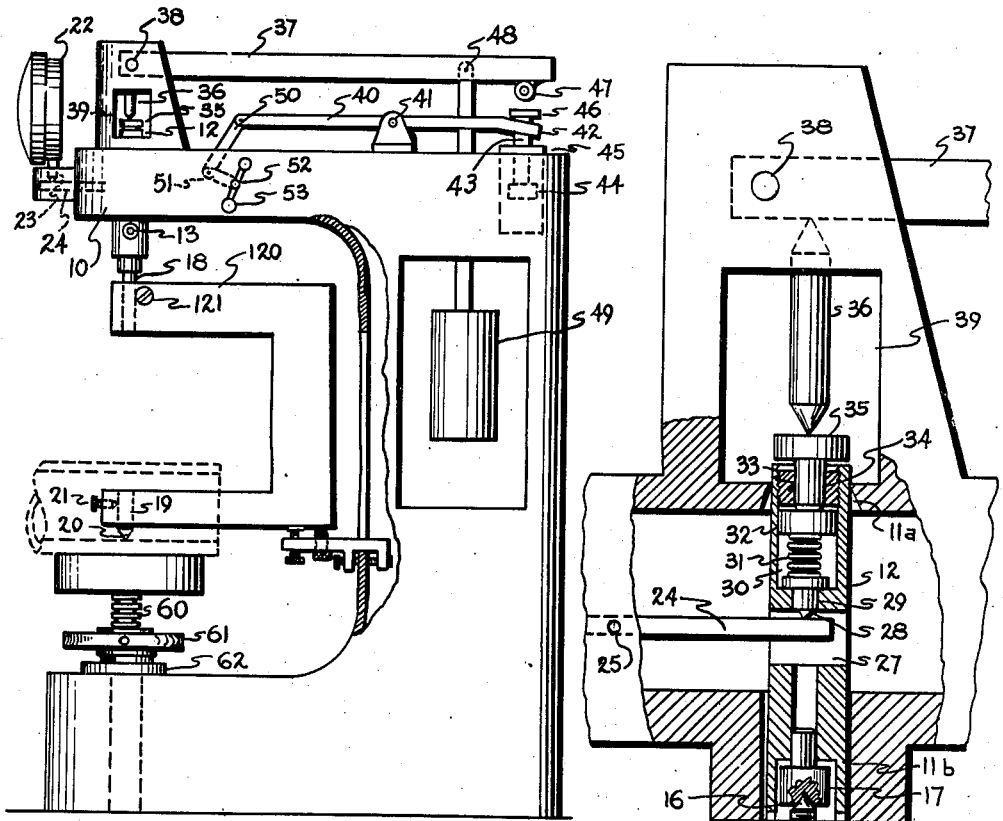
Fig. 1
Fig. 2
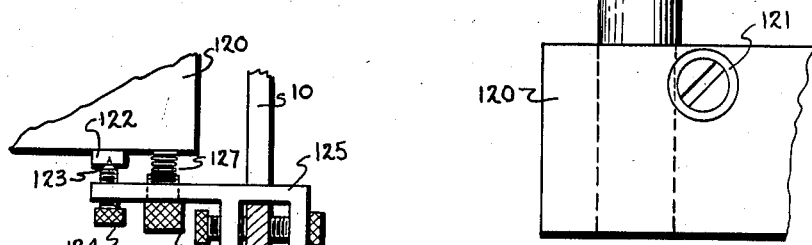
Fig. 3
INVENTOR.
Clyde W. Clark
BY Daniel G. Cullen
ATTORNEY.

Patented Sept. 21, 1943

2,329,827

UNITED STATES PATENT OFFICE 2,329,827

ADAPTER FOR TESTING MACHINES

Clyde W. Clark, Dearborn, Mich.

Application January 2, 1943, Serial No. 471,156

4 Claims. (Cl. 265—12)

This invention relates to hardness testers of the penetration point type and discloses, for such a device, an adapter permitting the device to be used interchangeably, and without variation, for testing bar or rod stock, or tube stock. The adapter is in the form of a C shaped element or gooseneck whose upper free end is carried by a spindle and whose lower free end carries the penetrator point. A tube may be telescoped over the lower free end so as to be tested.

For an understanding of the tester, reference should be had to the accompanying drawing, in which, Fig. 1 is a side view showing an adapter in place in a tester.

Figs. 2 and 3 are enlarged detail views.

The hardness tester hereof is an instrument designed to test the hardness of materials, such as metals, by penetration of a diamond point into the metal, the extent of penetration, under a predetermined load, affording a measurement of the hardness. The tester includes a C shaped frame 10 in whose upper forward end is located and slidably mounted a spindle 12 which is pressed down on its upper end by a power lever 37, under load, so that a diamond point 20 connected to the lower end of the spindle either directly, as in my prior application, Serial No. 384,083, filed March 19, 1941, or indirectly, through an adapter 120 whose provision is the novel feature hereof, can penetrate into a block of material to be tested, held against the diamond point by an elevating screw 60 which is in the lower forward end of the frame, directly below the spindle.

Referring to the drawing, it will be seen that these show the upper or forward end of the C shaped frame 10, aligned bores 11a and 11b of which slidably receive a hollow spindle 12, support for which is provided by the crosspin 13 held firmly in the frame 10 and through which is threaded an adjustable supporting or bearing screw 14 disposed on the spindle center line and whose upper conical end 15 seats in a centering conical hole 16 of a block 17 slidably seated in and guiding the spindle body. The lower end of the hollow spindle is closed by a plug or bushing 18.

In my prior application, Serial No. 384,083, this part carries a holder 19 at whose lower tip is a diamond point 20. In this application, this part is shown as fixed to and carrying the upper part of a C shaped adapter or gooseneck 120, or by a fastening screw 121, and this gooseneck carries, at its lower end, a holder 19 at whose lower tip is a diamond point 20, a set screw 21 helping to fasten the holder in place.

On the forward end of the frame 10 is mounted a gauge 22 whose movable element 23 is moved upwardly by a downward motion of the spindle, the operative connection between the spindle and the movable element 23 being established by a lever or actuating arm 24, fulcrumed at 25, an end of the arm 24 passing through and into a cross slot 27 of the spindle to be engaged by a pressure point 28 formed as a lower tip of a block 29 disposed in and closing a hole of the spindle. This hole opens into a cavity 30 containing a coiled compression spring 31 which has its lower end seated on a shoulder of the block 29 and its upper end engaging a slidable washer 32 disposed beneath a hollow adjusting nut 33 threaded into the upper end of the spindle. Within this nut and seating on washer 32 is the shank 34 of a pad 35 on whose upper face is a cross groove receiving the lower knife edge of a link 36 whose upper knife edge is seated in a groove or slot in the lower face of the power lever 37 which is fulcrumed on the frame at 38; link 36 thus helping to center the spindle.

It will also be observed that penetrator point 20, spindle bearing point 15—16, gauge pressure point 28, the bearing point of pad 35 on washer 32, the bearing point of washer 32 on spring 31, the bearing point of spring 31 on block 29, and the bearing point of load link 36 on pad 35, are all in one common line, the centerline of the spindle 12.

The gap between the pad 35 and the upper end of the spindle is initially adjustable by the nut 33 and is closed for the minor load setting of the tester gauge dial, i. e., the compression of spring 31, by elevation of the elevating screw when a part to be tested is held between that screw and the diamond point 20, thus determining the minor load setting of the machine for hardness testing. The relative position of pad 35 and spindle body 12 is made visible by viewing the size of the gap between them (through opening 39) and determines the relative position of the spindle point 28 and the gauge.

Shown here is a system for raising the power lever and weight, and for freeing it for dropping and applying the load to the link 36. The left-hand end of the power lever 37 is pivoted on the frame 10 at 38, and when the power lever is pulled down, there will be transmitted to link 36 and spindle 12 a force to press the diamond point 20 into the object being tested. In the testing operation, the power lever, with its weight, is first raised, and thereupon is freed so that the weight can pull the power lever down and thus cause the diamond point 20 to penetrate the object being tested. For raising the power lever 37 there is provided the system shown. That system includes an elevating arm 40 pivotally mounted at 41 on the frame of the machine, and having its right end 42 forked to straddle a piston rod 43 connected to a piston 44 sliding within a dashpot 45, the upper end of the rod 43 having a head 46 adapted to engage a roller 47, mounted on the right end of the power lever 37 near the point 48 where the weight 49 is suspended from the power lever. The left end of the elevating arm 40 is connected by a toggle linkage 50—51 to a cross shaft 52 journalled in the frame of the machine, and having an exposed hand lever 53.

The operation is as follows:

When the handle 53 is in the power lever raised position, the toggle linkage 50—51 will hold the dash-pot piston rod 43 and the power lever 37 elevated, and there will be no load applied to the spindle 12. When the handle 53 is moved clockwise, however, to the power lever freeing position, the elevating arm 40 will rotate clockwise on pivot 41 to free itself from the head 46 of the dash-pot piston rod 43, thus to free the power lever 37 so that weight 49 can pull the power lever downwardly, completely free of the elevating mechanism parts, and with its movement restrained solely by the dash-pot piston. Thus, during the time that the penetration force is being applied to the diamond point, the power lever and spindle are completely free of the elevating arrangement and thus the penetration is not affected by friction existing within the various bearings and pivots of the elevating system for the power lever.

Also shown here is the elevating screw 60 which passes through the lower forward end of the frame 10 to be manipulated by the conventional hand wheel 61. The screw passes clear through a bushing 62, seated in a hole of the frame.

*The adapter*

The adapter 120, fixed to the spindle by screw 121, and carrying the holder 19 and the penetrating point 21, arranged on the spindle center line, a line passing through the spindle support 15, the power or load link 36, and the spindle pressure point 28, has a conical seat 122 near its lower rear or closed portion receiving the cone point 123 of a screw 124 threaded into a bracket 125 adjustably fixed to the tester frame 10, as by screws 126. Bracket 125 also carries a compensator spring 127 and an adjustment screw 128 for that spring.

At the conclusion of a test, both the spindle and the adapter 120 move down, as a unit, onto their supports or center points 15—123, which thus center the spindle and adapter. When a subsequent test is started, and the work is raised by the screw 60 to engage the penetrating point 20, both the spindle and the adapter are lifted, as a unit, off their supports 15—123 and they remain off their supports during the test.

The adapter is formed C shaped or as a gooseneck, to permit a tube to be telescoped over its lower forward end, enabling a tester, equipped with the adapter, to be used without change for testing tube stock or bar stock. The testing of tube stock, resting on a holder carried by the screw 60, is shown.

The adapter is in the form of a thick rigid C shaped casting and may well be considered as integral with the spindle which carries it. Its weight and shape, however, make the use of the adapter bearing 122—123 and the spring 127 desirable.

I claim:

1. In a penetrating point type hardness testing apparatus, a frame, a spindle adapted to be moved down by a testing load bearing on its upper end, an adapter in the form of a gooseneck of C form having an open forward side and positioned outside of the frame, and formed to be applicable to and removable from the frame and the spindle as a unit, without requiring dismantling of the spindle, the frame, or the adapter, the adapter having an upper end removably attached to and thus movable with the spindle, and having a penetrating point on its lower end, means providing a centering bearing for the spindle with respect to the frame, said bearing being on a common line with the point of application of load on the spindle, the penetrating point, and the spindle centerline, and means providing a centering bearing for the lower end of the adapter with respect to the body or frame, the adapter bearing being remote from the spindle centerline and common line of the load point and the penetrating point and spindle bearing point.

2. In a penetrating point type hardness testing apparatus, a frame, a spindle adapted to be moved down by a testing load bearing on its upper end, an adapter attached to and thus movable with the spindle, and having a penetrating point on its lower end, means providing a centering bearing for the spindle with respect to the frame, said bearing being on a common line with the point of application of load on the spindle, the penetrating point, and the spindle centerline, and means providing a centering bearing for the lower end of the adapter with respect to the body or frame, the adapter bearing being remote from the spindle centerline and common line of the load point and the penetrating point and spindle bearing point, the spindle and adapter being arranged to be lifted completely off their respective bearings upon the application of a lifting force to the penetrating point.

3. In a penetrating point type hardness testing apparatus, a frame, a spindle adapted to be moved down by a testing load bearing on its upper end, an adapter attached to and thus movable with the spindle, and having a penetrating point on its lower end, means providing a centering bearing for the spindle with respect to the frame, said bearing being on a common line with the point of application of load on the spindle, the penetrating point, and the spindle centerline, and means providing a centering bearing for the lower end of the adapter with respect to the body or frame, the adapter bearing being remote from the spindle centerline and common line of the load point and the penetrating point and spindle bearing point, the spindle and adapter being arranged to be lifted completely off their respective bearings upon the application of a lifting force to the penetrating point, the adapter being in the form of a gooseneck of C form, with the open side forward, and with the adapter bearing being near the back or bight of the gooseneck.

4. In a penetrating point type hardness testing apparatus, a frame, a spindle adapted to be moved down by a testing load bearing on its upper end, an adapter in the form of a gooseneck of C form having an open forward side and positioned outside of the frame, and formed to be applicable to and removable from the frame and the spindle as a unit, without requiring dismantling of the spindle, the frame, or the adapter, the adapter having an upper end removably attached to and thus movable with the spindle, and having a penetrating point on its lower end, means providing a centering bearing for the spindle with respect to the frame, said bearing being on a common line with the point of application of load on the spindle, the penetrating point, and the spindle centerline, and means providing a centering bearing for the lower end of the adapter with respect to the body or frame, the adapter bearing being remote from the spindle centerline and common line of the load point and the penetrating point and spindle bearing point, the spindle and adapter being arranged to be lifted completely off their respective bearings upon the application of a lifting force to the penetrating point.

CLYDE W. CLARK.